US008541098B2

(12) United States Patent
Allemand

(10) Patent No.: US 8,541,098 B2
(45) Date of Patent: Sep. 24, 2013

(54) PURIFICATION OF METAL NANOSTRUCTURES FOR IMPROVED HAZE IN TRANSPARENT CONDUCTORS MADE FROM THE SAME

(75) Inventor: Pierre-Marc Allemand, San Jose, CA (US)

(73) Assignee: Cambrios Technology Corporation, Sunnyvale, CA (US)

( * ) Notice: Subject to any disclaimer, the term of this patent is extended or adjusted under 35 U.S.C. 154(b) by 277 days.

(21) Appl. No.: 12/862,664

(22) Filed: Aug. 24, 2010

(65) Prior Publication Data
US 2011/0045272 A1  Feb. 24, 2011

Related U.S. Application Data

(60) Provisional application No. 61/274,974, filed on Aug. 24, 2009.

(51) Int. Cl.
*B32B 5/16* (2006.01)
*D04H 1/00* (2006.01)

(52) U.S. Cl.
USPC ..................... 428/292.1; 428/323; 977/762

(58) Field of Classification Search
None
See application file for complete search history.

(56) References Cited

U.S. PATENT DOCUMENTS

| | | | |
|---|---|---|---|
| 3,167,429 A | 1/1965 | Levy | 96/61 |
| 3,552,969 A | 1/1971 | Henn et al. | 96/66 |
| 4,486,350 A | 12/1984 | Bauer et al. | 260/245.86 |
| 4,539,041 A | 9/1985 | Figlarz et al. | 75/0.5 A |
| 5,565,143 A | 10/1996 | Chan | 252/514 |
| 6,221,222 B1 | 4/2001 | Kipp et al. | |
| 6,597,947 B1 | 7/2003 | Inoue et al. | 604/20 |
| 7,048,806 B2 | 5/2006 | Ochomogo et al. | 134/34 |
| 8,269,214 B2 | 9/2012 | Smigelski, Jr. et al. | |
| 2005/0056118 A1 | 3/2005 | Xia et al. | 75/330 |
| 2007/0034052 A1 | 2/2007 | Vanheusden et al. | 75/362 |
| 2007/0074316 A1 | 3/2007 | Alden et al. | 977/762 |
| 2007/0160647 A1 | 7/2007 | Pritchard et al. | 424/423 |
| 2008/0003130 A1 | 1/2008 | Xia et al. | 420/501 |
| 2008/0143906 A1* | 6/2008 | Allemand et al. | 349/43 |
| 2008/0210052 A1 | 9/2008 | Allemand | 75/300 |
| 2008/0229612 A1 | 9/2008 | Sommer et al. | 36/44 |
| 2008/0259262 A1 | 10/2008 | Jones et al. | 349/139 |
| 2009/0052029 A1 | 2/2009 | Dai et al. | 359/486 |
| 2009/0098405 A1 | 4/2009 | Matsunami | |
| 2009/0130433 A1 | 5/2009 | Takada | |
| 2009/0196788 A1 | 8/2009 | Wang et al. | |
| 2009/0228131 A1 | 9/2009 | Wolk et al. | 700/103 |
| 2009/0242231 A1 | 10/2009 | Miyagisima et al. | 174/68.1 |
| 2009/0321113 A1 | 12/2009 | Allemand et al. | 174/257 |
| 2010/0034693 A1 | 2/2010 | Li | 420/501 |
| 2010/0307792 A1 | 12/2010 | Allemand et al. | 174/126.1 |
| 2011/0024159 A1 | 2/2011 | Allemand et al. | 174/126.1 |

FOREIGN PATENT DOCUMENTS

| | | |
|---|---|---|
| EP | 1 623 954 A1 | 2/2006 |
| JP | 2008-190006 A | 8/2008 |
| WO | WO 2009/017852 A2 | 2/2009 |

OTHER PUBLICATIONS

Ducamp-Sanguesa et al., "Synthesis and Characterization of Fine and Monodisperse Silver Particles of Uniform Shape," *Journal of Solid State Chemistry*, 100: 272-280, 1992.
Filankembo et al., "Is the Anion the Major Parameter in the Shape Control of Nanocrystals?," *Journal of Physical Chemistry*, 107: 7492-7500, 2003.
Jana et al., "Wet chemical synthesis of silver nanorods and nanowires of controllable aspect ratio," *Chemical Communications*: 617-618, 2001.
Kim et al., "Platonic Gold Nanocrystals," *Angewandte Chemie*, 116: 3759-3763, 2004.
Nikoobakht et al., "Preparation and Growth Mechanism of Gold Nanorods (NRs) Using Seed-Mediated Growth Method," *Chem. Mater.*, 15: 1957-1962, 2003.
Silvert et al., "Preparation of colloidal silver dispersions by the polyol process Part 1—Synthesis and characterization," *J. Mater. Chem.*, 6 (4): 573-577, 1996.
Silvert et al., "Preparation of colloidal silver dispersions by the polyol process Part 2—Mechanism of particle formation," *J. Mater. Chem.* 7 (2): 303-309, 1997.
Sun et al., "Crystalline Silver Nanowires by Soft Solution Processing," *Nano Letters*, 2 (2): 165-168, 2002.
Sun et al., "Large-Scale Synthesis of Uniform Silver Nanowires Through a Soft, Self-Seeding, Polyol Process," *Adv. Mater.*, 14 (11): 833-837, 2002.
Sun et al., "Uniform Silver Nanowires Synthesis by Reducing $AgNO_3$ with Ethylene Glycol in the Presence of Seeds and Poly (Vinyl Pyrrolidone)," *Chem. Mater.*, 14: 4736-4745, 2002.
Sun et al., "Shape-Controlled Synthesis of Gold and Silver Nanoparticles," *Science*, 298 (5601): 2176-2179, 2002.
Wiley et al., "Polyol Synthesis of Silver Nanoparticles: Use of Chloride and Oxygen to Promote the Formation of Single-Crystal, Truncated Cubes and Tetrahedrons," *Nano Letters*, 4 (9): 1733-1739, 2004.
Wiley et al., "Polyol Synthesis of Silver Nanostructures: Control of Product Morphology with Fe (II) or Fe (III) Species," *Langmuir*, 21 (18): 8077-8080, 2005.
Yang et al., "Anisotropic syntheses of boat-shaped core-shell Au—Ag nanocrystals and nanowires," *Nanotechnology* 17: 2304-2310, 2006.
Advanced Nano Products, "Nano silver ink for ink jet printing," (Jun. 2, 2009 via Internet Wayback Machine), http://www.anapro.com/english/product/nano_silver.asp.
Chen et al., "The influence of seeding conditions and shielding gas atmosphere on the synthesis of silver nanowires through the polyol process," *Nanotechnology* 17: 466-174, 2006.
International Search Report and Written Opinion mailed Aug. 10, 2010, for PCT/US2010/033618, filed May 4, 2010 (14 pages).
Okada et al., "Development of Fine Circuit Pattern Formation Process Using Nano-Metal Ink," *SEI Technical Review* 62: 54-57, Jun. 2006.

(Continued)

*Primary Examiner* — Sheeba Ahmed

(74) *Attorney, Agent, or Firm* — Seed IP Law Group PLLC

(57) ABSTRACT

Provided are a method of isolating and purifying metal nanowires from a crude and complex reaction mixture that includes relatively high aspect ratio nanostructures as well as nanostructures of low aspect ratio shapes, and conductive films made of the purified nanostructures.

7 Claims, 2 Drawing Sheets

(56) References Cited

OTHER PUBLICATIONS

Sun et al., "Polyol Synthesis of Uniform Silver Nanowires: A Plausible Growth Mechanism and the Supporting Evidence," *Nano Letters* 3(7): 955-960, 2003.

Sun et al., "Template-Engaged Replacement Reaction: A One-step Approach to the Large-Scale Synthesis of Metal Nanostructures with Hollow Interiors," *Nano Letters* 2(5): 481-485, 2002.

Tang et al., "Rapid and high-yield synthesis of silver nanowires using air-assisted polyol method with chloride ions," *Colloids and Surfaces A: Physicochemical and Engineering Aspects* 338: 33-39, 2009.

ULVAC Materials Division Inc., "Nano-metal Ink" (Apr. 7, 2011), http://www.ulvac.co.jp/eng/products/materials/nanoparticle-technology.html.

ULVAC Materials Division Inc., Establishment of the World's First Consortium for the Development and Commercialization of Next-Generation Functional Circuit Boards Using Nano Paste, (Oct. 23, 2002), http://www.ulvac.co.jp/eng/information/news/2002/20021023.html.

Wiley et al., "Polyol Synthesis of Silver Nanoparticles: Use of Chloride and Oxygen to Promote the Formation of Single-Crystal, Truncated Cubes and Tetrahedrons," *Nano Letters* 4(10): 2057, 2004 [correction to 4(9): 1733-1739, 2004].

* cited by examiner

PURIFICATION OF METAL NANOSTRUCTURES FOR IMPROVED HAZE IN TRANSPARENT CONDUCTORS MADE FROM THE SAME

CROSS-REFERENCE TO RELATED APPLICATION

This application claims the benefit under 35 U.S.C. §119 (e) of U.S. Provisional Patent Application No. 61/274,974 filed Aug. 24, 2009, where this provisional application is incorporated herein by reference in its entirety.

BACKGROUND

1. Technical Field

This disclosure is related to purification of metal nanostructures and low-haze transparent conductors made from the same.

2. Description of the Related Art

Transparent conductors are optically clear and electrically conductive films. They are in widespread use in areas of display, touch-panel, photovoltaic (PV), various types of e-paper, electrostatic shielding, heating or anti-reflective coatings (e.g., windows), etc. Various technologies have produced transparent conductors based on one or more conductive media such as conductive nanostructures. Generally, the conductive nanostructures form a conductive network through long range interconnectivity.

Depending on the end use, transparent conductors can be created with predetermined performance parameters including, for example, sheet resistance, optical transparency, and haze. These performance parameters are generally directly related to the morphologies and monodispersity of the conductive nanostructures.

Currently available synthetic methods for preparing metal nanostructures typically produce a range of nanostructure morphologies and not all of them are desirable. Thus, there is a need in the art to isolate and enrich metal nanostructures of certain desirable morphologies.

BRIEF SUMMARY

Provided are a method of isolating and purifying metal nanowires from a crude and a complex reaction mixture that includes relatively high aspect ratio nanostructures as well as nanostructures of low aspect ratio shapes, and conductive films made of the purified nanostructures.

One embodiment provides a process of isolating metal nanowires, the process comprises:

(a) providing a crude mixture of nanostructures that includes nanostructures having an aspect ratio of 10 or more and nanostructures having an aspect ratio of no more than 10, the crude mixture being suspended in a polyol solvent;

(b) providing a first diluted crude mixture by combining water with the crude mixture;

(c) providing a combined ketone mixture by combining the diluted crude mixture with a ketone;

(d) providing a precipitate comprising nanostructures having an aspect ratio of 10 or more, and a supernatant comprising at least a portion of the nanostructures having aspect ratios of no more than 10, providing the precipitate including allowing sedimentation of the combined ketone mixture; and (e) removing from the precipitate the supernatant comprising the at least a portion of the nanostructures having aspect ratios of no more than 10.

In further specific embodiments, the process may further comprise (f) re-suspending the precipitate of (d) in water to provide a second diluted crude mixture; and (g) repeating steps (c)-(f).

In various embodiments, the nanostructures having aspect ratio of 10 or more are silver nanowires.

In various embodiments, the ketone is acetone.

A further embodiment provides an ink composition comprising:

a plurality of nanostructures having aspect ratios of 10 or more;

a liquid carrier; wherein the nanostructures having aspect ratios of 10 or more are purified by:

(a) providing a crude mixture of nanostructures that includes nanostructures having an aspect ratio of 10 or more and nanostructures having an aspect ratio of no more than 10, the crude mixture being suspended in a polyol solvent;

(b) providing a first diluted crude mixture by combining water with the crude mixture;

(c) providing a combined ketone mixture by combining the diluted crude mixture with a ketone;

(d) providing a precipitate comprising nanostructures having an aspect ratio of 10 or more, and a supernatant comprising at least a portion of the nanostructures having aspect ratios of no more than 10, providing the precipitate including allowing sedimentation of the combined ketone mixture; and (e) removing from the precipitate the supernatant comprising the at least a portion of the nanostructures having aspect ratios of no more than 10.

(f) re-suspending the precipitate of (d) in water to provide a second diluted crude mixture; and (g) repeating steps (c)-(f).

Yet another embodiment provides a conductive film comprising: a conductive network of a plurality of silver nanowires that has a resistance of at least 200 ohm/sq; and no more than 1500 nanostructures having an aspect ratio of less than 10 per millimeter square area of the conductive film.

In a further embodiment, such a conductive film has a haze of no more than 0.5%.

A further embodiment provides a conductive film that has a resistance of at least 600 ohm/sq; and no more than 500 nanostructures having an aspect ratio of less than 10 per millimeter square area of the conductive film.

In a further embodiment, such a conductive film has a haze of no more than 0.25%.

DETAILED DESCRIPTION OF THE INVENTION

Figure 1:
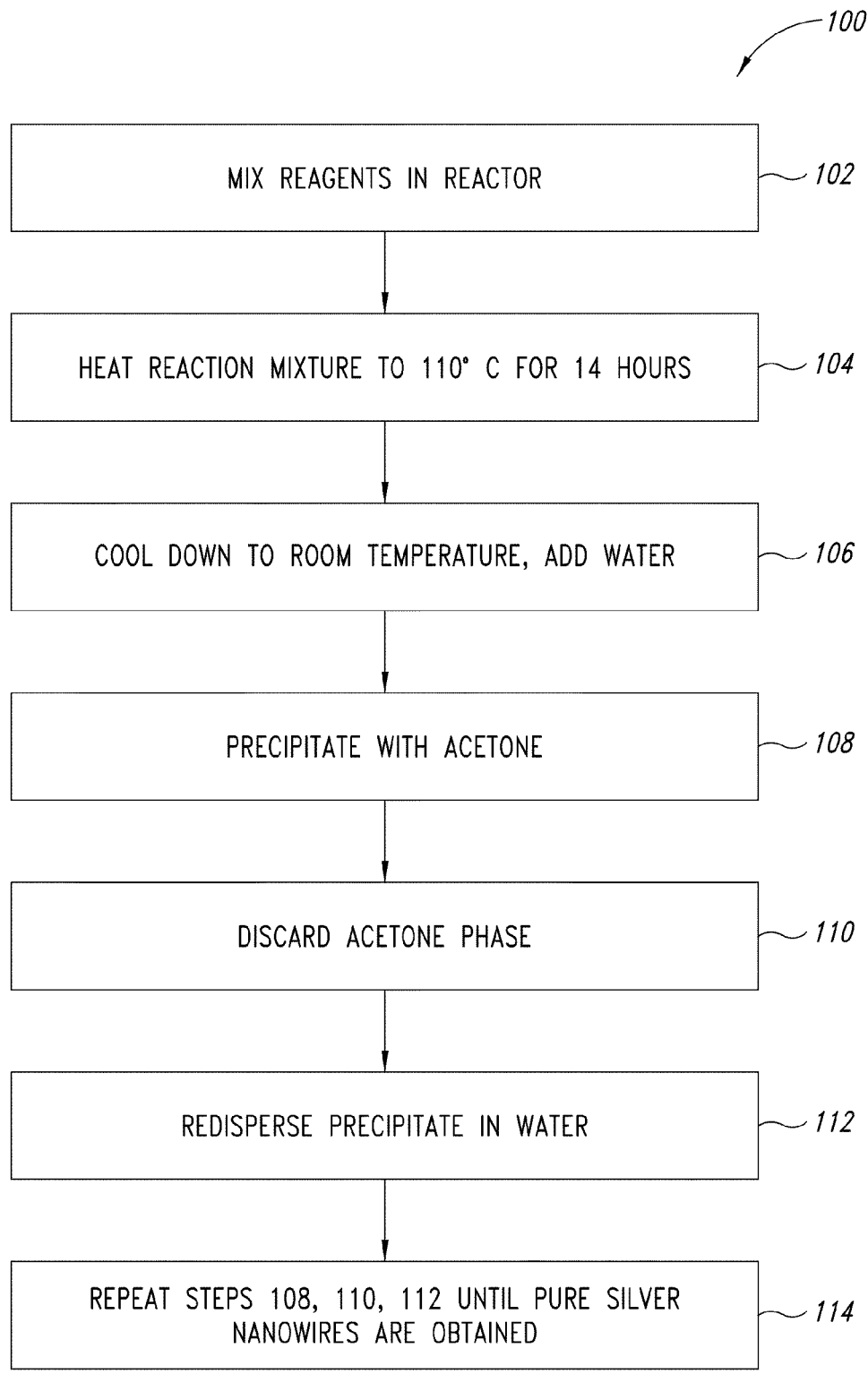
FIG. 1 shows a process of purifying metal nanowires by acetone wash(es) in accordance with an embodiment of this disclosure.

Provided herein is a method for isolating and purifying nanostructures of certain morphologies from a mixture of nanostructures of various morphologies. In particular, substantially all of the purified metal nanostructures have aspect ratios of 10 or more.

As used herein, "conductive nanostructures" or "nanostructures" generally refer to electrically conductive nano-sized structures, at least one dimension of which is less than 500 nm, more preferably, less than 250 nm, 100 nm, 50 nm or 25 nm. Typically, the nanostructures are made of a metallic material, such as an elemental metal (e.g., transition metals) or a metal compound (e.g., metal oxide). The metallic material can also be a bimetallic material or a metal alloy, which comprises two or more types of metal. Suitable metals include, but are not limited to, silver, gold, copper, nickel, gold-plated silver, platinum and palladium.

The nanostructures can be of any shape or geometry. The morphology of a given nanostructure can be defined in a simplified fashion by its aspect ratio, which is the ratio of the length over the diameter of the nanostructure. For instance, certain nanostructures are isotropically shaped (i.e., aspect ratio=1). Typical isotropic nanostructures include nanoparticles. In preferred embodiments, the nanostructures are anisotropically shaped (i.e., aspect ratio≠1). The anisotropic nanostructure typically has a longitudinal axis along its length. Exemplary anisotropic nanostructures include nanowires, nanorods, and nanotubes, as defined herein.

The nanostructures can be solid or hollow. Solid nanostructures include, for example, nanoparticles, nanorods and nanowires. "Nanowires" typically refers to long, thin nanostructures having aspect ratios of greater than 10, preferably greater than 50, and more preferably greater than 100. Typically, the nanowires are more than 500 nm, more than 1 μm, or more than 10 μm long. "Nanorods" are typically short and wide anistropic nanostructures that have aspect ratios of no more than 10.

Hollow nanostructures include, for example, nanotubes. Typically, the nanotube has an aspect ratio (length:diameter) of greater than 10, preferably greater than 50, and more preferably greater than 100. Typically, the nanotubes are more than 500 nm, more than 1 μm, or more than 10 μm in length.

Nanostructures of higher aspect ratio (e.g., nanowires) may be favored over nanostructures of lower aspect ratio (no more than 10) because fewer of the longer the nanostructures may be required to achieve a target conductivity. Fewer nanostructures in a conductive film may also lead to higher optical transparency and lower haze, both parameters finding a broad range of applications in display technology.

Synthesis and Purification of Metal Nanostructures

A solution-based synthesis (also referred to as the "polyol" process) is reasonably effective in large-scale production of metal nanostructures. See, e.g., Sun, Y. et al., (2002) *Science*, 298, 2176; Sun, Y. et al., (2002) *Nano Lett.* 2, 165; Sun, Y. et al., (2002) *Adv. Mater.* 14, 833; Kim, F. et al., (2004) *Angew. Chem. Int. Ed.* 116, 3759; and U.S. Published Application 2005/0056118. The polyol process involves the reduction of a precursor (e.g., a metal salt) of the metal nanostructure by a polyol, an organic compound comprising at least two hydroxyl groups (e.g., ethylene glycol), in the presence of poly(vinyl pyrrolidone) ("PVP"). Typically, the polyol serves the dual functions of the reducing agent as well as the solvent. Exemplary polyols include, but are not limited to, ethylene glycol, 1,2-propylene glycol, 1,3-propylene glycol, and glycerol.

Generally speaking, the shapes and sizes of the nanostructures formed are influenced by parameters including relative amounts of PVP and the metal salt, concentrations of PVP and the metal salt, reaction time, and reaction temperature. Further, the addition of a suitable ionic additive (e.g., tetrabutylammonium chloride or tetrabutylammonium bromide) to the above reaction mixture was found to increase the yield and monodispersity of the resulting nanowires. This synthesis is described in more detail in applicants' co-owned and co-pending U.S. patent application Ser. No. 11/766,552, which application is incorporated herein in its entirety.

Although the polyol process may be optimized to produce predominately nanowires, in reality a complex collection of nanostructures are formed as the crude reaction products. For example, besides metal nanowires, metal nanostructures of various morphologies, including nanoparticles, nanocubes, nanorods, nanopyramids and multi-ply twinned particles, may also have been obtained. The problem is compounded by poor reproducibility of the process, which is likely caused by trace amounts of contaminants in the constituents of the synthesis. See, e.g., Wiley, B. et al., (2004) *Nano Lett.* 4(9), 1733-1739.

As discussed herein, to form a transparent conductor in which nanostructures form a conductive network, it may be desirable to reduce the amount of nanostructures other than nanowires because the latter may not effectively contribute to conductivity, and their presence may contribute to haze. As used herein, "low aspect ratio nanostructures" or "contaminants," includes, for example, nanostructures that are relatively wide and/or short (e.g., nanoparticles, nanorods), and have a relatively small aspect ratio (<10). Some or all of these low aspect ratio nanostructures may be seen as "bright objects" in a conductive film due to their bright appearance on dark field micrographs. The bright objects may, thus, significantly increase the haze of the conductive film.

Isolating nanowires from the low aspect ratio nanostructures in a mixture of crude products has proved to be difficult or inefficient. In particular, a typical isolation method involves sedimentation, which allows for the nanostructures to precipitate while a liquid phase including the polyol and PVP forms the supernatant. However, it is common that the low aspect ratio nanostructures co-precipitate with the nanowires and become nearly impossible to separate. In addition, the co-precipitated nanowires and the low aspect ratio nanostructures are often difficult to be re-suspended in a liquid phase, impeding any effort of further purification. Moreover, certain polyol solvents are so viscous (e.g., glycerol) that a protracted sedimentation process may be necessary before any appreciative amount of nanostructures can precipitate.

Thus, one embodiment provides a post-synthesis purification method that isolates metal nanowires from a crude reaction mixture that includes metal nanowires as well as metal nanostructures having aspect ratios of less than 10 (e.g., nanoparticles and nanorods). In particular, the purification process introduces one or more wash cycles by a ketone (e.g., acetone), which selectively and progressively removes substantially all of the metal nanostructures having aspect ratios of less than 10. The method addresses the difficulties commonly faced in nanowire purification by allowing for rapid formation of a precipitation dominated by nanowires, easy re-suspension of the nanowire precipitation for further purification, and selective redistribution of the nanostructures of low aspect ratio (e.g., no more than 10) in the supernatant.

More specifically, the process comprises:

(a) providing a crude mixture of nanostructures that includes nanostructures having an aspect ratio of 10 or more and nanostructures having an aspect ratio of no more than 10, the crude mixture being suspended in a polyol solvent;

(b) providing a first diluted crude mixture by combining water with the crude mixture;

(c) providing a combined ketone mixture by combining the diluted crude mixture with a ketone;

(d) providing a precipitate comprising nanostructures having an aspect ratio of 10 or more, and a supernatant comprising at least a portion of the nanostructures having aspect ratios of no more than 10, providing the precipitate including allowing sedimentation of the combined ketone mixture; and (e) removing from the precipitate the supernatant comprising the at least a portion of the nanostructures having aspect ratios of no more than 10.

Preferably, the process further comprises:

(f) re-suspending the precipitate of (d) in water to provide a second diluted crude mixture; and (g) repeating steps (c)-(f).

As used herein, "crude mixture," includes nanowires and any level of low aspect ratio nanostructures, if such low aspect ratio nanostructures are to be removed or reduced. In certain embodiments, the crude mixture is a reaction mixture immediately following the synthesis of metal nanowires before any purification takes place. In other embodiments, the crude mixture may include nanowires that have been purified by at least one ketone wash, and will be further purified.

Although the process is applicable to any nanostructures having relatively high anisotropy, such as, without limitation, nanowire and nanotubes, the process is preferred for silver nanowire purification. The polyol solvent can be, for example, ethylene glycol, 1,2-propylene glycol, 1,3-propylene glycol, and glycerol.

The ketone is preferably a low boiling point, simple ketone that has no more than 8 carbons total. Exemplary ketones include, but are not limited to, acetone, methyl ethyl ketone (MEK), 2 or 3-pentanone. A preferred ketone is acetone. The amount of ketone used in the wash cycle may vary. It is typically in excess of the suspending solvent (e.g., water) in the crude mixture by 1, 2, 3, 4, 5, or 6 times by weight.

FIG. 1 is a flow chart illustrating an embodiment of such a process 100 for purifying silver nanowires. Silver nanowires are initially synthesized by mixing appropriate reagents (e.g., a silver salt, PVP and glycerol) in a reaction (block 102). Thereafter, the reaction is heated to 110° C. and allowed to react for about 14 hours (block 104). The reaction is then cooled down to room temperature to a crude mixture of predominately nanowires accompanied by contaminants, whereupon water is added to form a diluted crude mixture (block 106). Thereafter, the crude product is added into an excessive amount of acetone (e.g., twice or more as much acetone by weight) and the nanowires, accompanied by a certain level of contaminate, precipitate out (block 108). The supernatant comprises water, glycerol and acetone, which are miscible and form a homogeneous liquid phase that appears to promote the redistribution of the contaminants into the supernatant. The acetone phase (supernatant) is then discarded (block 110). The nanowire precipitate is re-suspended in water (block 112) and the steps illustrated in blocks 108, 110, and 112 are repeated (e.g., for 10 times). Thus, each acetone wash cycle creates a redistribution of nanowires and contaminates in the precipitate and supernatant, respectively, until the precipitate contains progressively more and more nanowires and the low aspect ratio nanostructures are progressively negligible.

Conductive Films

As discussed herein, "conductive films" or "transparent conductors" are thin films formed by a network of interconnecting nanostructures. The electrical conductivity of the conductive film is often measured by "film resistivity" or "sheet resistance," which is represented by "ohm/square," or "ohm/sq," or "Ω/□." The film resistance is a function of at least the surface loading density (i.e., the number of conductive nanowires per unit square area), the size/shapes of the nanostructures, and the intrinsic electrical property of the nanostructure constituents. As used herein, a thin film is considered conductive if it has a sheet resistance of no higher than $10^8 \Omega/\square$. Preferably, the sheet resistance is no higher than $10^4 \Omega/\square$, $3,000\Omega/\square$, $1,000\Omega/\square$, or 100 $\Omega/\square$. Typically, the sheet resistance of a conductive network formed by metal nanostructures is in the ranges of from $10\Omega/\square$ to $1000\Omega/\square$, from $100\Omega/\square$ to $750\Omega/\square$, from $50\Omega/\square$ to $200\Omega/\square$, from $100\Omega/\square$ to $500\Omega/\square$, from $100\Omega/\square$ to $250\Omega/\square$, from $10\Omega/\square$ to $200\Omega/\square$, from $10\Omega/\square$ to $50\Omega/\square$, or from $1\Omega/\square$ to $10\Omega/\square$.

Optically, the conductive film can be characterized by "light transmission" as well as "haze." Transmission refers to the percentage of an incident light transmitted through a medium. The incident light refers to ultra-violet (UV) or visible light having a wavelength between about 250 nm to 800 nm. In various embodiments, the light transmission of the conductive film is at least 50%, at least 60%, at least 70%, at least 80%, at least 85%, at least 90%, or at least 95%. The conductive film is considered "transparent" if the light transmission is at least 85%. Haze is an index of light diffusion. It refers to the percentage of the quantity of light separated from the incident light and scattered during transmission (i.e., transmission haze). Unlike light transmission, which is largely a property of the medium (e.g., the conductive film), haze is often a production concern and is typically caused by surface roughness and embedded particles or compositional heterogeneities in the medium. In various embodiments, the haze of the transparent conductor is no more than 10%, no more than 8%, no more than 5%, no more than 1.5% or no more than 1%.

By isolating nanowires from low aspect ratio nanostructures, it is possible to minimize or eliminate the bright objects in the conductive film formed thereof. Thus, in certain embodiments, for a particular set of performance parameters, such as relative low resistance and low haze, it is important to limit the number of the low aspect ratio nanostructures below a certain threshold level, which can be characterized by the counts of such nanostructures within a unit area.

Thus, one embodiment provides a conductive film that has a resistance of at least 200 ohm/sq, and no more than 1500 low aspect ratio nanostructures per millimeter square area of the conductive film. In a specific embodiment, the conductive film has a haze of no more than 0.5%.

Another embodiment provides a conductive film that has a resistance of at least 600 ohm/sq and no more than 500 low aspect ratio nanostructures per millimeter square area of the conductive film. In a specific embodiment, the conductive film has a haze of no more than 0.25%.

The number or counts of the low aspect ratio nanostructures can be ascertained by visualizing a conductive film under magnification (e.g., ×100) in dark field mode. The fewer low aspect ratio nanostructures, the higher conductivity can be expected for a given loading density.

To prepare such a conductive film, a liquid dispersion of the purified nanowires can be deposited on a substrate, followed by a drying or curing process. The liquid dispersion is also referred to as an "ink composition" or "ink formulation." The ink composition typically comprises a plurality of nanowires and a liquid carrier.

The ink composition can be prepared based on a desired concentration of the total nanostructures (e.g., nanowires), which is an index of the loading density of the final conductive film formed on the substrate.

The liquid carrier can be any suitable organic or inorganic solvent or solvents, including, for example, water, a ketone, an alcohol, or a mixture thereof. The ketone-based solvent can be, for example, acetone, methylethyl ketone, and the like. The alcohol-based solvent can be, for example, methanol, ethanol, isopropanol, ethylene glycol, diethylene glycol, triethylene glycol, propylene glycol, and the like.

The ink composition may further include one or more agents that prevent or reduce aggregation or corrosion of the nanostructures, and/or facilitate the immobilization of the nanostructures on the substrate. These agents are typically non-volatile and include surfactants, viscosity modifiers, corrosion inhibitors, and the like.

In certain embodiments, the ink composition includes surfactants, which serve to reduce aggregation of the nanostructures. Representative examples of suitable surfactants include fluorosurfactants such as ZONYL® surfactants, including ZONYL® FSN, ZONYL® FSO, ZONYL® FSA, ZONYL® FSH (DuPont Chemicals, Wilmington, Del.), and NOVEC™ (3M, St. Paul, Minn.). Other exemplary surfactants include non-ionic surfactants based on alkylphenol ethoxylates. Preferred surfactants include, for example, octylphenol ethoxylates such as TRITON™ (×100, ×114, ×45), and nonylphenol ethoxylates such as TERGITOL™ (Dow Chemical Company, Midland, Mich.). Further exemplary non-ionic surfactants include acetylenic-based surfactants such as DYNOL® (604, 607) (Air Products and Chemicals, Inc., Allentown, Pa.) and n-dodecyl β-D-maltoside.

In certain embodiments, the ink composition includes one or more viscosity modifiers, which serve as a binder that immobilizes the nanostructures on a substrate. Examples of suitable viscosity modifiers include hydroxypropyl methylcellulose (HPMC), methyl cellulose, xanthan gum, polyvinyl alcohol, carboxy methyl cellulose, and hydroxy ethyl cellulose.

In particular embodiments, the ratio of the surfactant to the viscosity modifier is preferably in the range of about 80 to about 0.01; the ratio of the viscosity modifier to the metal nanowires is preferably in the range of about 5 to about 0.000625, or in the range of 2 to 0.5, or in the range of 10 to 0.1, or the range of 0 to 2; and the ratio of the metal nanowires to the surfactant is preferably in the range of about 560 to about 5. The ratios of components of the ink composition may be modified depending on the substrate and the method of application used. The preferred viscosity range for the ink composition is between about 1 and 100 cP. In any one of the above embodiments, the metal nanowires may preferably be silver nanowires.

The substrate can be any material onto which nanowires are deposited. The substrate can be rigid or flexible. Preferably, the substrate is also optically clear, i.e., light transmission of the material is at least 80% in the visible region (400 nm-700 nm).

Examples of rigid substrates include glass, polycarbonates, acrylics, and the like. In particular, specialty glass such as alkali-free glass (e.g., borosilicate), low alkali glass, and zero-expansion glass-ceramic can be used. The specialty glass is particularly suited for thin panel display systems, including Liquid Crystal Display (LCD).

Examples of flexible substrates include, but are not limited to: polyesters (e.g., polyethylene terephthalate (PET), polyester naphthalate, and polycarbonate), polyolefins (e.g., linear, branched, and cyclic polyolefins), polyvinyls (e.g., polyvinyl chloride, polyvinylidene chloride, polyvinyl acetals, polystyrene, polyacrylates, and the like), cellulose ester bases (e.g., cellulose triacetate, cellulose acetate), polysulphones such as polyethersulphone, polyimides, silicones, and other conventional polymeric films.

The ink composition can be deposited on the substrate according to, for example, the methods described in co-pending U.S. patent application Ser. No. 11/504,822.

Spin coating is a typical technique for depositing a uniform film on a substrate. By controlling the loading amount, spin speed, and time, thin films of various thicknesses can be formed. It is understood that the viscosity, the shear behavior of the suspending fluid, as well as the interactions between the nanowires, may affect the distribution and interconnectivity of the nanowires deposited.

For example, the ink compositions described herein can be spin-coated on a glass substrate at a speed of 400-2000 rpm for 60 seconds, with acceleration of 1000 rpm/s. The thin film can be further subjected to certain post-treatments, including baking at 50° C. for 90 seconds and 140° C. for 90 seconds. Pressure treatment with or without heat can be further employed to adjust the final film specifications.

As understood by one skilled in the art, other deposition techniques can be employed, e.g., sedimentation flow metered by a narrow channel, die flow, flow on an incline, slit coating, gravure coating, microgravure coating, bead coating, dip coating, slot die coating, and the like. Printing techniques can also be used to directly print an ink composition onto a substrate with or without a pattern. For example, inkjet, flexoprinting, and screen printing can be employed.

EXAMPLES

Example 1

Purification by Acetone Wash

To 500 g of glycerol in a clean glass bottle was added 7.5 g PVP, 55 mg TBAC, 2.5 g silver nitrate. The bottle was capped and the mixture was heated in a 110° C. convection oven for about 14 hours. Once the reaction mixture was cooled to 30° C., 500 g of DIW was added. The crude diluted reaction mixture was added to 2 kg of acetone, producing a semi-solid dark brown precipitate. The supernatant liquid was separated from the semi-solid precipitate by decantation or by filtration through a medium porosity glass frit. Unexpectedly, the silver nanowires contained in this precipitate could easily be re-suspended in DIW. Thus, the precipitate was then re-suspended in about 200 g DIW and re-precipitated in 800 g acetone. These precipitation/re-suspension steps were repeated several times until a light tan fluffy precipitate was obtained. This precipitate was re-suspended in DIW and was found to contain mainly thin and long silver nanowires, almost free of small nanoparticles, large particles, and bright triangular silver crystals, while the acetone phases contained mainly these unwanted particles, together with a small amount of silver nanowires.

Example 2

Transparent Conductors Made of Purified Nanowires

Transparent conductive thin films were prepared by spin coating, on a glass substrate, an ink composition comprising the purified silver nanowires of Example 1 and HPMC in water. Comparative samples of transparent conductors were also similarly prepared using silver nanowires that were similarly synthesized except for the respective polyol solvents used in each synthesis and the post-synthesis acetone wash. Table 1 demonstrates that, for a given sheet resistivity, the transmission and haze are considerably improved in the transparent conductor formed of the purified silver nanowires obtained from the glycerol solvent, because of a reduced number of low aspect ratio nanostructures as well as the thinner diameters in the nanowires.

TABLE 1

|  | No Acetone Wash | Acetone Wash |
| --- | --- | --- |
| Polyol solvent | Ethylene glycol | Glycerol |
| % Transmission | 88.1 | 90.1 |
| % Haze | 2.85 | 1.54 |
| Resistivity | 25 | 24 |

Example 3

Counts of Bright Objects in Transparent Conductive Film

Figure 2:
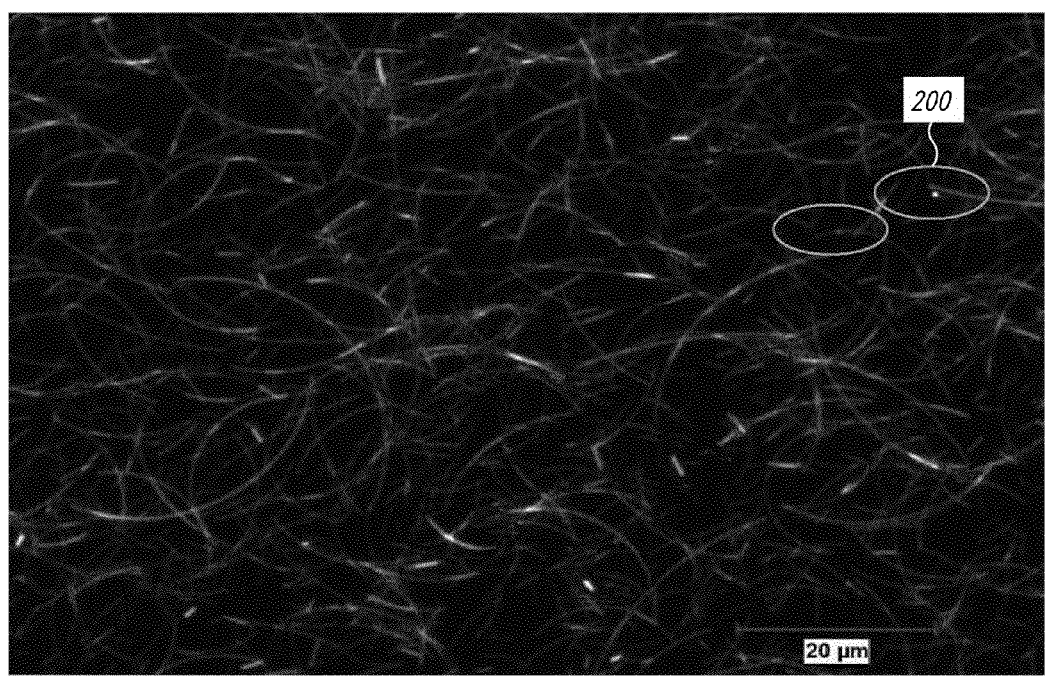
FIG. 2 demonstrates nanostructure counts in a unit area of a transparent conductor in which nanostructures with aspect ratios less than 10 are visually identified and counted.

Conductive film was prepared by spin coating as described in Example 2. The number of the low aspect ratio nanostructures was determined by visualizing a conductive film formed of purified silver nanowires under a microscope at approximately 100× magnification and in dark field mode. Pictures were taken of multiple frames and the low aspect ratio nanostructures counted (FIG. 2). The low aspect ratio nanostructures 200 were typically brighter, shorter or wider than the silver nanowires. In particular, the low aspect ratio nanowires had an aspect ratio of less than 10. The counts of each frame were averaged and converted to per unit surface area.

Table 2 shows the counts of the low aspect ratio nanostructures in two films of different loading densities, which correspond to respective resistances, transmission, and haze. In particular, the haze of film 2 is 50% of that of Film 1 because of, at least in part, a fewer number of low aspect ratio nanostructures.

TABLE 2

|  | Film 1 | Film 2 |
| --- | --- | --- |
| Resistivity (Ohm/sq.) | 170 | 600 |
| Transmission (T %) | 92.6 | 93.1 |
| Haze (%) | 0.42 | 0.21 |
| Frame | Low aspect ratio Nanostructures Counts | Low aspect ratio Nanostructures Counts |
| 1 | 11 | 2 |
| 2 | 9 | 4 |
| 3 | 8 | 6 |
| 4 | 9 | 3 |
| 5 | 8 | 2 |
| 6 | 8 | 4 |
| 7 | 7 | 5 |
| 8 | 5 | 2 |
| 9 | 13 | 2 |
| 10 | 11 | 6 |
| Average Nanostructure Counts Per Frame | 8.9 | 3.6 |
| Low aspect ratio Nanostructures Counts per mm$^{-2}$ | 1070 | 433 |

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A conductive film comprising:
   a conductive network of a plurality of silver nanowires that has a resistance of at least 200 ohm/sq; and
   no more than 1500 nanostructures having an aspect ratio of less than 10 per millimeter square area of the conductive film.

2. The conductive film of claim 1, wherein the conductive film has a haze of no more than 0.5%.

3. The conductive film of claim 1 wherein the conductive film has a resistance of at least 600 ohm/sq; and no more than 500 nanostructures having an aspect ratio of less than 10 per millimeter square area of the conductive film.

4. The conductive film of claim 3 wherein the conductive film has a haze of no more than 0.25%.

5. The conductive film of claim 1 further comprising a viscosity modifier.

6. The conductive film of claim 5 wherein the viscosity modifier and the silver nanowires are in a w/w ratio of 10 to 0.1.

7. The conductive film of claim 1 wherein the viscosity modifier is hydroxypropyl methylcellulose (HPMC).

* * * * *

UNITED STATES PATENT AND TRADEMARK OFFICE
CERTIFICATE OF CORRECTION

| | | |
|---|---|---|
| PATENT NO. | : 8,541,098 B2 | Page 1 of 1 |
| APPLICATION NO. | : 12/862664 | |
| DATED | : September 24, 2013 | |
| INVENTOR(S) | : Pierre-Marc Allemand | |

It is certified that error appears in the above-identified patent and that said Letters Patent is hereby corrected as shown below:

Title Page, Item (73):
"Cambrios Technology Corporation, Sunnyvale, CA (US)" should read, --Cambrios Technologies Corporation, Sunnyvale, CA (US)--.

Signed and Sealed this
Nineteenth Day of August, 2014

Michelle K. Lee
*Deputy Director of the United States Patent and Trademark Office*